UNITED STATES PATENT OFFICE.

AUGUST LEOPOLD LASKA, OF OFFENBACH-ON-THE-MAIN, GERMANY, ASSIGNOR TO THE FIRM OF K. OEHLER, ANILIN- & ANILINFARBEN-FABRIK, OF OFFENBACH-ON-THE-MAIN, GERMANY.

INDOPHENOL SULFONIC ACIDS AND PROCESS OF MAKING SAME.

No. 798,807.   Specification of Letters Patent.   Patented Sept. 5, 1905.

Application filed April 13, 1905. Serial No. 255,472. (Specimens.)

*To all whom it may concern:*

Be it known that I, AUGUST LEOPOLD LASKA, doctor of philosophy, chemist, residing at 5 Gerberstrasse, Offenbach-on-the-Main, in the Grand Duchy of Hesse, Germany, have invented certain new and useful Improvements in Indophenol Sulfonic Acids, of which the following is a specification.

My invention relates to the production of new indophenol sulfonic acids, which are distinguished from other indophenol bodies by their fair stability. These new indophenol sulfonic acids can be obtained by simultaneously oxidizing in an alkaline solution para-phenylendiamin sulfonic acid and a phenol. They represent very important initial materials in the manufacture of sulfur dyes.

The following example will serve to illustrate the manner in which my invention may be best carried out. Dissolve forty-seven parts of para-phenylendiamin sulfonic acid and 27.2 parts of meta-cresol in five hundred parts of water and seventy parts of soda-lye, (35° Baumé,) cool with ice, and oxidize by means of sodium hypochlorite corresponding to eight parts real oxygen. Hereby the temperature may rise to $+5°$ centigrade without essentially altering the result. The solution becomes bluish violet. On addition of common salt the indophenol sulfonic acid separates as a precipitate with a metallic luster in a practically quantitative yield. After filtering and drying a blackish-brown powder results, which dissolves in water to a bluish violet, turning into a pure blue on adding concentrated sodium-lye and into a blackish blue on addition of diluted hydrochloric acid. In concentrated sulfuric acid the indophenol sulfonic acid dissolves with a yellowish green color. Sodium sulfid yields the light yellow solution of the diphenylamin derivate. The corresponding indophenol sulfonic acid from ortho-cresol is formed in a similar manner. Its aqueous solution is some redder and is also changed to blue by concentrated sodium-lye.

The indophenol sulfonic acid from phenol is distinguished by its exceedingly easy solubility and may be precipitated from the pure blue oxidation liquid, but with difficulty.

The indophenol sulfonic acid, obtainable in the manner above described from alpha-oxynaphtoic acid, dissolves in water with a claret red, being in its behavior very like to the before-mentioned indophenol sulfonic acids.

Instead of sodium hypochlorite other oxidizing means acting in alkaline solutions in equimolecular proportions may be employed.

Now what I claim, and desire to secure by Letters Patent, is the following:

1. The process of making indophenol sulfonic acids, consisting in simultaneously oxidizing para-phenylendiamin sulfonic acid and a phenol.

2. The process of making indophenol sulfonic acids, consisting in simultaneously oxidizing in an alkaline solution para-phenylendiamin sulfonic acid and a phenol.

3. As new articles, the indophenol sulfonic acids which are obtained by simultaneously oxidizing in an alkaline solution para-phenylendiamin sulfonic acid and a phenol, and which, in the form of their sodium-salt in a dry state, represent a black-brown powder, dissolve in water to a bluish-violet solution, being rendered somewhat bluer on adding sodium-lye, and changing into a blackish blue, while simultaneously precipitating the indophenol sulfonic acid, on addition of hydrochloric acid, all substantially as hereinbefore described.

In testimony that I claim the foregoing as my invention I have signed my name, in presence of two witnesses, this 31st day of March, 1905.

AUGUST LEOPOLD LASKA.

Witnesses:
HERMANN WEIL,
HEINRICH NEUENHANT.